United States Patent [19]

Erickson et al.

[11] B 4,002,107

[45] Jan. 11, 1977

[54] DISPOSABLE FLUID ACTUATOR

[75] Inventors: Rodney R. Erickson, Joliet; Melvin H. Peters, Minooka; Daniel L. McMillan, Morris, all of Ill.

[73] Assignee: Caterpillar Tractor Co., Peoria, Ill.

[22] Filed: Dec. 17, 1973

[21] Appl. No.: 425,193

[44] Published under the second Trial Voluntary Protest Program on March 23, 1976 as document No. B 425,193.

[52] U.S. Cl. .................................. 92/163; 92/161; 92/168; 92/169; 29/511
[51] Int. Cl.² ..................... F16J 11/02; F01B 29/00
[58] Field of Search ............ 92/169, 170, 118, 119, 92/165 R, 166, 168, 163; 29/511

[56] References Cited
UNITED STATES PATENTS

| 2,487,262 | 11/1949 | Mueller ............................... 92/118 |
| 2,865,215 | 12/1958 | Bishop ............................. 92/165 R |
| 3,040,712 | 6/1962 | Harrah .............................. 92/170 |
| 3,211,348 | 10/1965 | Greer ............................. 222/386.5 |
| 3,251,434 | 5/1966 | Roenick ............................. 181/36 |
| 3,259,147 | 7/1966 | Mercier et al. ...................... 138/30 |
| 3,650,182 | 3/1972 | Phillips ............................. 92/169 |
| 3,811,367 | 5/1974 | Bimba ............................... 92/169 |

FOREIGN PATENTS OR APPLICATIONS

| 1,555,323 | 3/1973 | Germany ............................ 92/130 |
| 1,154 | 11/1903 | United Kingdom ................... 92/170 |

*Primary Examiner*—Paul E. Maslousky
*Attorney, Agent, or Firm*—Phillips, Moore, Weissenberger, Lempio & Strabala

[57] ABSTRACT

A double acting fluid pressure operated linear motor has an extruded cylinder member with a head endwall and mounting tang formed integrally thereon and has an annular step formed in the interior chamber at the rod end. A piston within the cylinder member is connected to a rod which extends through an end cap fitted against the annular step, the ends of the cylinder member being deformed inwardly to retain the end cap, rod and piston in place. This construction enables such devices to be manufactured extremely economically so that it is practical to discard and replace the actuator, if necessary, rather than performing repairs.

1 Claim, 4 Drawing Figures

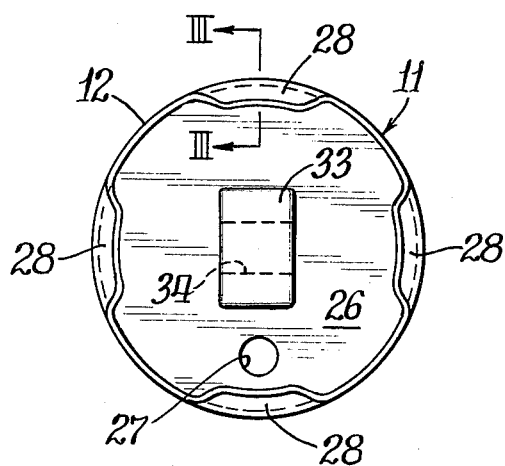
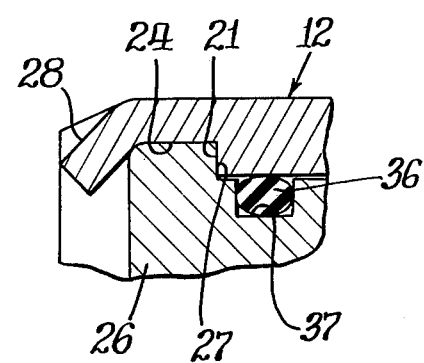
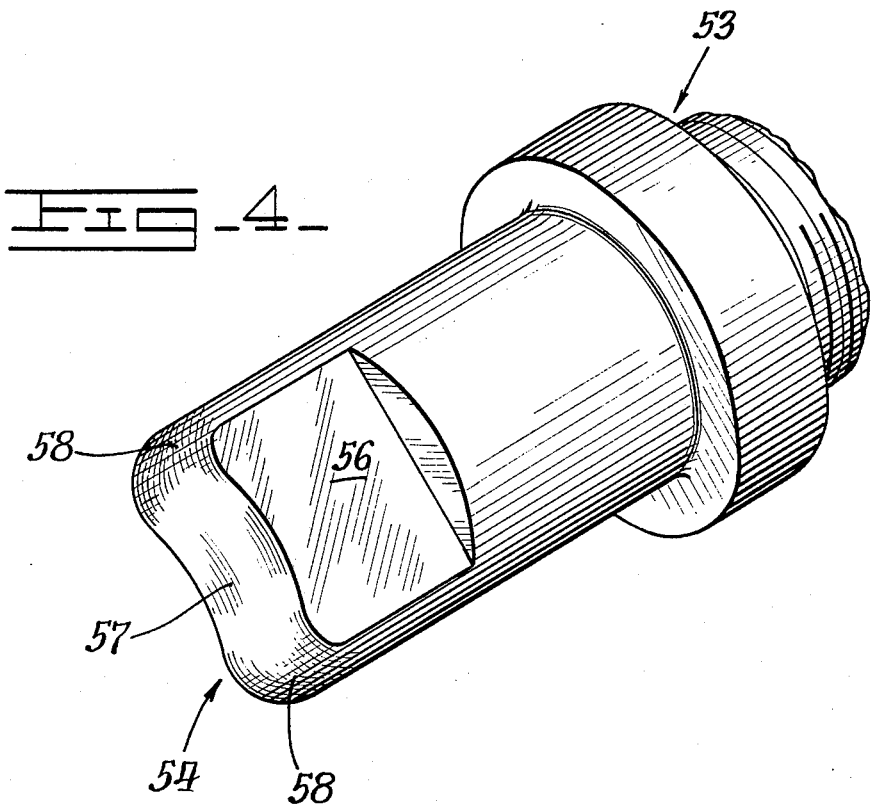

4,002,107

DISPOSABLE FLUID ACTUATOR

BACKGROUND OF THE INVENTION

This invention relates to fluid pressure operated actuators and to a method of manufacture thereof. Fluid actuators are also identified in the art by various other terms such as linear motor, hydraulic or pneumatic cylinders or as fluid jacks.

A fluid actuator consists essentially of a cylinder member or barrel with closure means at each end and a slideable piston in the cylinder member coupled to a rod which extends axially through one end closure for connection to some mechanism which is to be shifted or controlled by the actuator. Fluid actuators are used in diverse variety of equipment to provide for a reciprocating motion of some element or for effecting pivoting movement of one element relative to another.

As heretofore constructed, fluid actuators have required a sizeable number of separable parts several of which have required costly machining to precise tolerances during manufacture. Joining of certain component parts has been provided for largely by threaded fastenings of some kind. Internal seals and bearings are usually required in a fluid actuator and these often deteriorate after a period of use. As it has been considered necessary to replace such seals and bearings from time to time, the construction of prior fluid actuators has been further complicated by provisions intended to facilitate disassembly and servicing in the field. As a consequence of these several factors, prior fluid actuators in general are costly and complex mechanisms requiring considerable care and maintenance and occasional repairs.

SUMMARY OF THE INVENTION

This invention provides a simplified relatively low cost fluid actuator which as a practical matter may be treated as disposable. Because of a highly economical construction, the actuator requires no maintenance or repairs and may simply be discarded and replaced with another such actuator at the end of its useful life. A cylinder member having an integral head end closure and mounting tang at one end may be formed largely by extrusion rather than costly machining. A simple crimp secured end cap at the other end, through which the piston rod extends, serves to retain all principal components in position.

Accordingly, it is an object of this invention to provide a simplified less costly fluid actuator which requires little maintenance and no repairs in that it may be economically disposed of and replaced with a similar device when necessary.

The invention together with further objects and advantages thereof will best be understood by reference to the following description of a preferred embodiment taken in conjunction with the accompanying drawings.

BRIEF DESCRIPTION OF THE DRAWINGS

In the accompanying drawings:

FIG. 2 is a view of the rod end of the fluid actuator of FIG. 1, FIG. 3 is a partial section view of the actuator taken along line III—III of FIG. 2, and FIG. 4 is a perspective view of a specialized tool utilized in the manufacture of the actuator.

DESCRIPTION OF A PREFERRED EMBODIMENT

Figure 1:
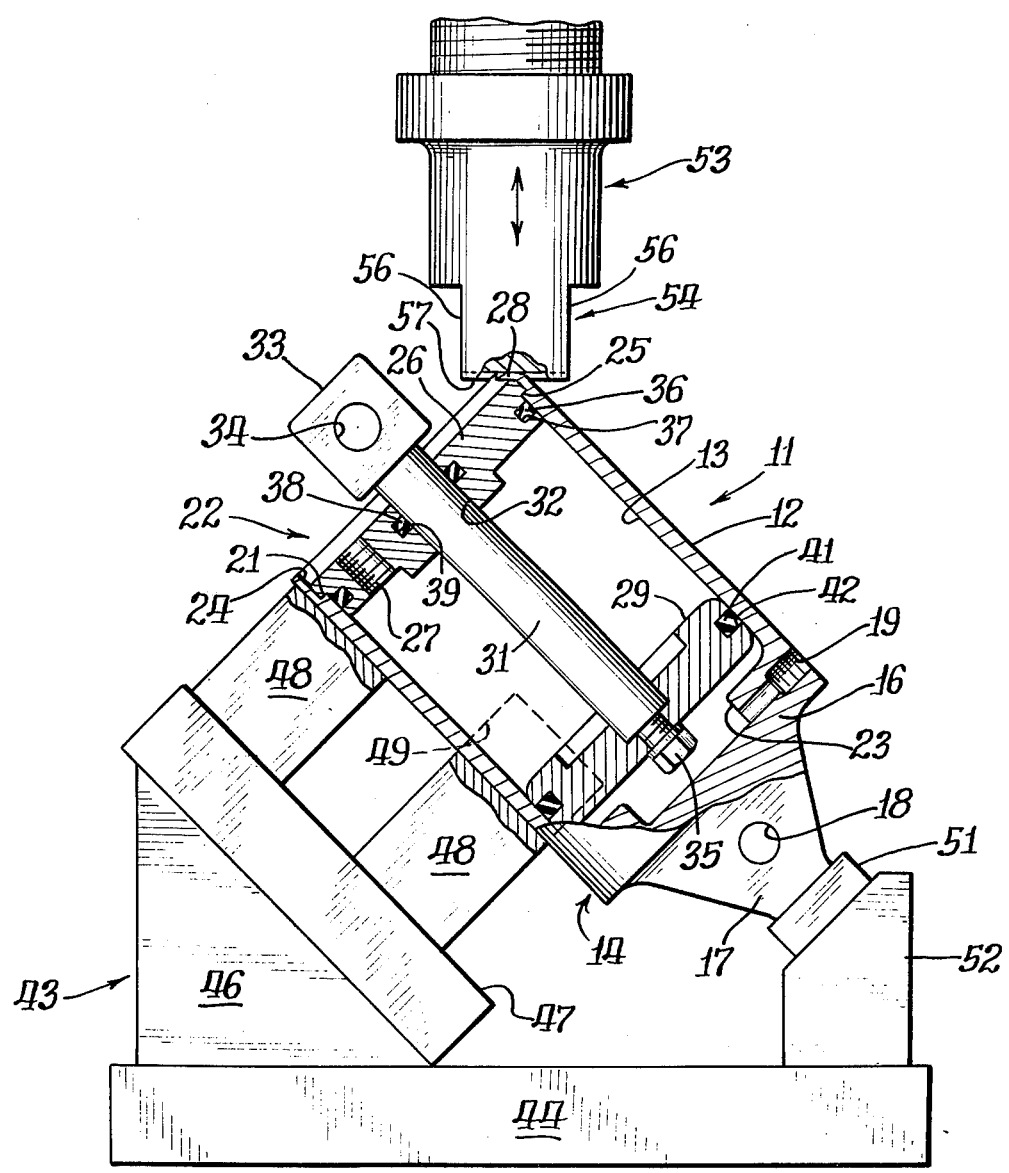
FIG. 1 is a side view of a fluid actuator in accordance with the invention with portions broken out in order to illustrate the interior construction, the actuator being shown mounted in a fixture used in the course of manufacture.

Referring initially to FIG. 1 of the drawing, the actuator 11 has cylinder member 12 with a cylindrical interior chamber 13 which is closed at the head end 14 by an endwall 16. A mounting tang 17 extends from the outer surface of the endwall. A transverse passage 18 in the tang 17 provides for attachment of the head end of the actuator to mechanism which is to be operated thereby. Endwall 16 and tang 17 are each integral portions of the cylinder member 12.

A cylinder member 12 of the above described configuration may readily be formed by known extrusion techniques to have an interior chamber 13 of sufficiently precise and constant dimensions to provide for fluid actuator usage without binding or excessive leakage. Relatively few machining operations need necessarily be performed on the cylinder member 12. These include the boring of the passage 18 and the boring and threading of a head end fluid port 19. In addition, an annular shoulder 21 is machined or otherwise formed within bore 12 near the opposite or rod end 22 of the actuator for purposes to be hereinafter described. Preferably, the extrusion process is arranged to form an interior central well 23 in endwall 16 so that the head end fluid port 19 may extend radially therein to communicate with the well.

Shoulder 21 is formed near rod end 22 of the actuator by a counterbore 24 which extends a short distance into the cylinder member 12 and which is of slightly greater diameter than the principal bore 13. Rod end 22 of the actuator is permanently closed by an annular end cap member 26 which is fitted coaxially into chamber 13 and counterbore 24 and which has an annular shelf 25 which seats against shoulder 21. End cap 26 has a rod end fluid port 27 which may be threaded, if desired, for receiving a fitting through which fluid is supplied and released from the rod end of the actuator.

Referring now to FIGS. 2 and 3 in conjunction, end cap 26 is permanently secured in the above described position by a bending or crimping of at least portions of the adjacent end of cylinder member 12 radially inward against the outer surface of the end cap. Four equiangularly spaced crimps 28 are provided in this example, although more or less may be used depending upon the pressures and forces to which the actuator will be subjected.

Referring again to FIG. 1, an annular piston 29 is disposed coaxially within cylinder member chamber 13 for axial movement therein. A rod 31 extends into chamber 13 along the axis thereof through a central opening 32 in end cap 26 and has an inner end secured to piston 29. Rod 31 is secured to the piston by a bolt 35 in this example but it will be apparent that other joining means such as welding may be employed or the piston and rod may be formed as an integral unit. To provide for connection of the rod 31 to an element which is operated by the actuator, an eye member 33 having a transverse passage 34 is formed on the outer end of the rod.

To prevent leakage, a seal 36 is disposed in an annular slot 37 in end cap 26 to bear against the interior wall of the cylinder member 12 and an additional seal 38 is situated in an interior slot 39 in end cap opening 32 to bear against rod 31. Still another annular seal 41 is disposed in an annular slot 42 in piston 29 to bear against the interior surface of the cylinder member 12.

The actuator 11 may be utilized in the conventional manner to move one mechanism element relative to another by pivotably coupling one such element to the head end through passage 18 and pivotably coupling the rod end of the actuator to the other element by means of passage 34. Upon admitting pressurized fluid to port 19, while venting port 27, the actuator is caused to extend while by admitting pressurized fluid to port 27 and venting port 19, contraction of the actuator is brought about. While the actuator 11 is adapted for double action as described above, it will be apparent that it may also be utilized as a single acting actuator by providing fluid connections to only one of the ports 19 and 27.

The above described actuator 11 may be very simply manufactured with little costly machining of parts. Following extrusion of the cylinder member 12 and machining of the mounting passage 18, head end port 19 and counterbore 24 therein, the cylinder member may be disposed in a fixture 43 for assembly of the actuator. Fixture 43 may have a base 44 supporting a bracket 46 with an inclined face 47 to which a pair of spaced apart locator blocks 48 are secured. Locator blocks 48 have cylindrical upper end surfaces 49 with a circular curvature conforming to that of the outer surfaces of cylinder member 12 and are positioned so that the cylinder member may be rested against surfaces 49 with the axis of the cylinder member in an inclined orientation and with the mounting tang 17 being lowermost. The end of tang 17 abuts a block 51 attached to a pedestal 52 which is in turn secured to the base 44.

With the cylinder member 12 positioned on the fixture 43 in the above described manner, rod 31 may be transpierced through the opening 32 of end cap 26 and the piston 29 is then secured to the end of the rod, the seals 36, 38 and 41 being positioned at the end cap and piston as previously described. Piston 29 is then inserted into the chamber 13 of cylinder member 12 and end cap 26 is fitted into place with shelf 25 abutted against shoulder 21.

A crimping tool 53 is disposed for reciprocal vertical motion above fixture 43 in a position where the lowermost end or crimping head 54 may be forcibly lowered against the uppermost point of the cylinder member 12. This deforms a portion of the end of the cylinder member radially inwardly toward the outer end surface of end cap 26 to form the previously described crimps 28. Successive ones of the crimps 28 may be readily formed by rotating the actuator 11 about the axis thereof between each crimping movement of the tool 53.

As best seen in FIG. 4, the crimping head 54 of tool 53 may be formed of cylindrical stock with a pair of flat portions 56 being machined at opposite sides thereof. Flats 56 extend to a working end surface 57 which is slightly convex in the direction parallel to the flats 56 and which is convex in a direction transverse thereto, and which has rounded ends 58. Referring again to FIG. 1, the crimping tool 53 is oriented in use so that the working end 57 extends in a substantially tangent relationship to the adjacent portion of the rod end of cylinder member 12. Downward motion then efficiently rolls the adjacent portion of the cylinder member radially inward to create the desired crimp 28.

While the actuator 11 as constructed and assembled in the above described manner cannot readily be disassembled for maintenance or repairs, it may be produced at a sufficiently low cost to be treated as disposable and may be replaced with a new such actuator when necessary.

While the invention has been described with respect to a single preferred embodiment, it will be apparent that modifications are possible and it is not intended to limit the invention except as defined in the following claims.

What is claimed is:

1. A disposable fluid actuator comprising:

a cylinder member having a cylindrical portion and a head end closure which is an integral element therewith and wherein a head end fluid port extends through said head end closure, said cylinder member also having a head end mounting tang extending from said closure, said tang also being an integral element of said cylinder member, said cylinder member having a rod end opposite from said head end closure and having an interior cylindrical chamber extending from said rod end towards said closure and also having a shorter counterbore extending inward from said rod end, said counterbore being of greater diameter than said interior chamber to form an annular shoulder in conjunction therewith which shoulder faces said rod end, a circular end cap disposed within said rod end of said cylinder member in coaxial relationship therewith, said end cap having a stepped peripheral surface forming an annular shelf which abuts said shoulder of said cylinder member, said end cap being held therein by a plurality of radially inwardly extending deformed portions of said rod end of said cylinder member, said end cap having a central opening therethrough for a piston rod, said end cap further having a rod end fluid port extending therethrough, a piston rod extending into said cylinder member through said opening of said end cap, and a piston disposed coaxially in said chamber for axial movement therewith, said piston being secured to said piston rod, said end cap and said piston rod and said piston being permanently secured to said cylinder member by said radially inwardly extending portions of said rod end of said cylinder member.

* * * * *